United States Patent [19]

Ther et al.

[11] Patent Number: 5,192,171

[45] Date of Patent: Mar. 9, 1993

[54] CHIP CONTROL INSERT

[75] Inventors: James Ther, Troy; Brendan L. Brockett, Dearborn Heights; John H. Patterson, Hazel Park, all of Mich.

[73] Assignee: GTE Valenite Corporation, Troy, Mich.

[21] Appl. No.: 638,236

[22] Filed: Jan. 7, 1991

[51] Int. Cl.⁵ .................... B23B 27/22; B23B 27/16
[52] U.S. Cl. ................................. 407/114; 407/116
[58] Field of Search ............... 407/114, 115, 116, 113

[56] References Cited

U.S. PATENT DOCUMENTS

| | | | |
|---|---|---|---|
| 3,271,842 | 9/1966 | Breuning | 407/114 |
| 3,786,541 | 1/1974 | Lundgren | 407/116 |
| 4,056,871 | 11/1977 | Bator | 407/114 |
| 4,116,576 | 9/1978 | Gawryk, Sr. | 407/114 |
| 4,507,024 | 3/1985 | Stashko | 407/114 |
| 4,561,809 | 12/1985 | Porat et al. | 407/114 |
| 4,626,141 | 12/1986 | Malaker et al. | 407/114 |
| 4,846,609 | 7/1989 | Bernadic et al. | 407/114 |
| 4,856,942 | 8/1989 | Bernadic et al. | 407/116 |
| 4,859,122 | 8/1989 | Patterson et al. | 407/116 |
| 4,963,061 | 10/1990 | Katbi et al. | 407/116 |

Primary Examiner—Steven C. Bishop
Attorney, Agent, or Firm—Bill C. Panagos

[57] ABSTRACT

Chip control insert having parallel side central aperture diamond configuration, a planar recess below peripheral cutting edges on each side, and characterized by a planar locating surface surrounding the central aperture with a substantial area recess intermediate the aperture and locating surface, said locating surface having corner and intermediate radial projections with inclined side walls to provide effective chip breaking.

8 Claims, 3 Drawing Sheets

CHIP CONTROL INSERT

BACKGROUND OF THE INVENTION

Many specific forms of chip control cutting inserts are known in the art including cemented carbide cutting inserts having parallel faces, generally diamond configuration, bottom recesses below the cutting edges and chip breaking walls projecting up from the bottom recess.

U.S. Pat. No. 4,626,141 discloses such insert characterized by a chip control groove extending across polygon insert corners and along edges extending from corners with increasing width away from the cutting corner. The groove is formed with a radius extending below a narrow positive rake cutting edge land to a maximum depth tangent with the bottom of the groove.

The most relevant prior art known to applicants is illustrated in three perspective views of alternative commercial inserts identified in applicants' drawings as PRIOR ART FIGS. 8A-8C.

BRIEF DESCRIPTION OF THE PRESENT INVENTION

The present cutting insert has been developed for general purpose application with effective satisfactory chip breaking, turning, facing, boring and contouring operations. As distinguished from the closest prior art illustrated in FIG. 8A, the present insert employs on each face an annular planar seating surface substantially spaced by a recess surrounding a central through aperture for securing the insert on a holder. Such recess serves to eliminate the need for a counterbore or tapered aperture edge, and reduces grind stock for top and bottom planar seating surfaces; it has also been found to significantly reduce insert warpage.

DETAILED DESCRIPTION OF PREFERRED EMBODIMENT

Figure 1:
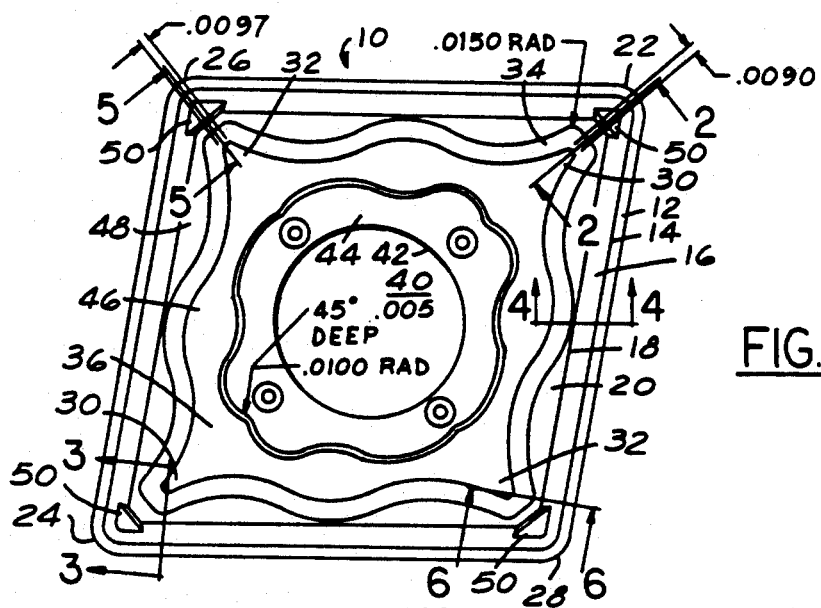
FIG. 1 is a face view of the insert of the present invention.
Figures 2, 3:
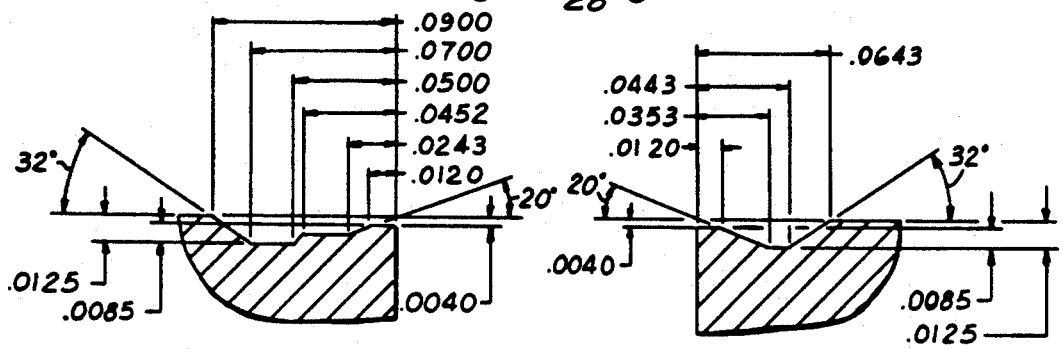
FIGS. 2-6 are respective fragmentary views taken along corresponding section lines shown in FIG. 1.
Figures 4, 5:
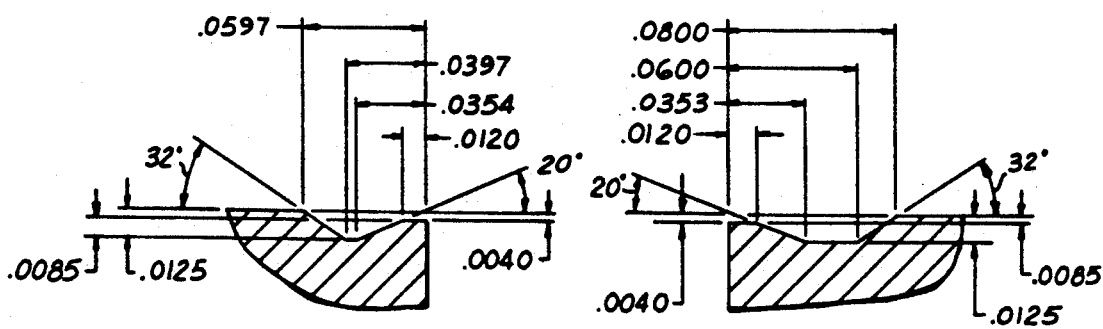
Figure 6:
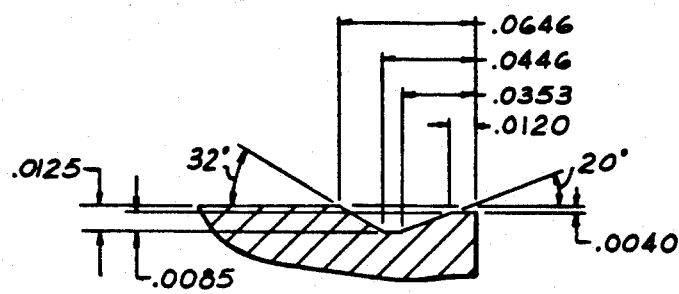
Figure 7:
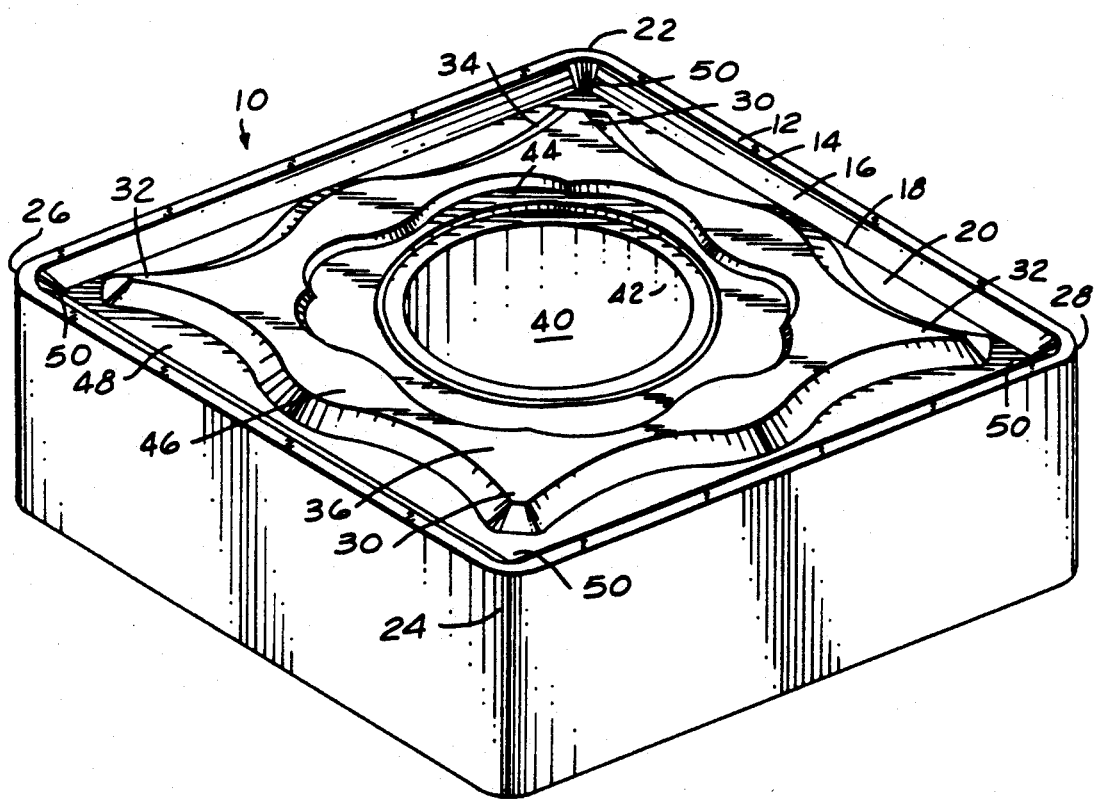
FIG. 7 is an enlarged perspective view corresponding to FIG. 1.
Figure 8A:
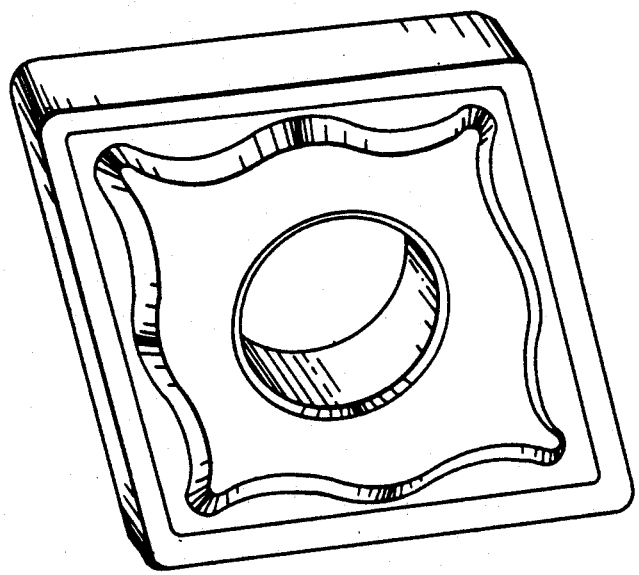
FIGS. 8A-8C are perspective views of three alternative prior art inserts.
Figure 8B:
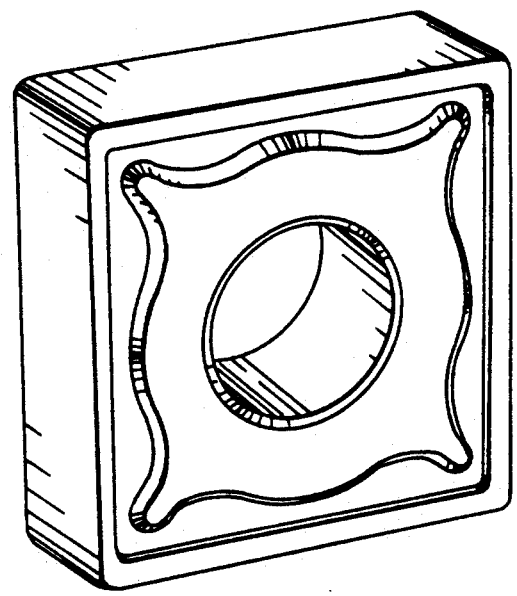
Figure 8C:
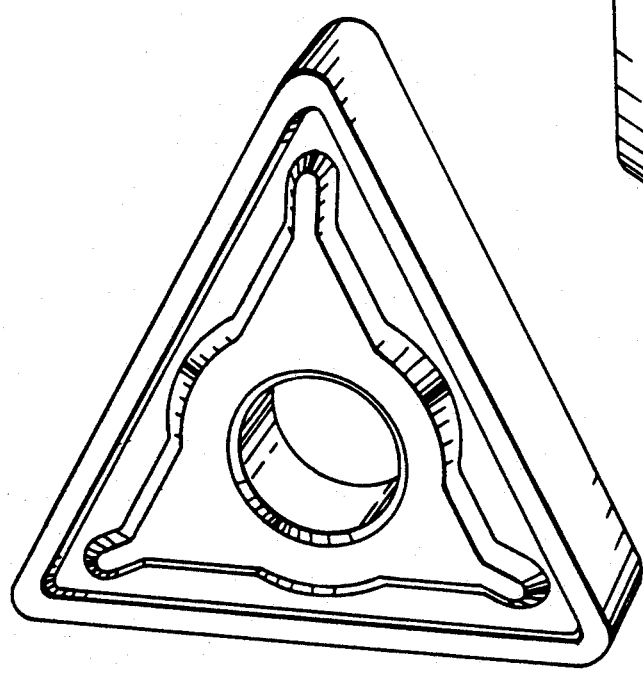

With reference to FIG. 1, insert 10 has a generally diamond exterior configuration with respectively 80° and 100° opposite acute and obtuse angles. It is provided with cutting edge land 12 extending to entry line 14 from which entry surface 16 descends at a 20° angle to bottom line 18 extending around planar bottom surface 20. Bidirectional acute cutting corners 22, 24 have rounded primary cutting edges and bidirectional obtuse cutting corners 26, 28 are used to create chamfers. Relatively longer chip breaking points 30 are provided at the acute corners and relatively shorter chip breaking points 32 at the obtuse corners, each of which is flanked by chip breaking ramp surface 34 having an incident angle of 32°. As shown in FIGS. 2, 3, 5 and 6, the seating surface of each point extends above cutting land 12, as an integral extension in a common plane with principal annular seating surface 36.

Conventional locating/clamping aperture 40 having cylindrical side wall 42 is provided at the center of the insert within planar recess 44 extending approximately 0.005" below annular seating surface 36. Bulged extensions 46 of seating surface 36 adjacent the midpoint of each insert cutting edge serve to enhance supporting geometry because of closeness to land 12 and aid in chip breaking especially during facing, backfacing and profiling operations. Varied groove width 48 changes chip flow and chip breakage within the assigned range of feed rate, of approximately 0.010-0.024" per revolution, and depth of cut, approximately 0.050-0.200". As stated above, recess 44 reduces insert warpage, eliminates need for counterbore and reduces grind stock for top and bottom seating surfaces.

Typical dimensions shown in FIGS. 2-6 of the various fragmentary sectional views correspond to a ½" IC chip control insert having ¼" thickness with the same locating and chip breaking pattern on both sides for reversible use, with sides extending normal to the faces and with neutral cutting edge lands 12. From the dimensions illustrated, it is apparent that each cutting land 12 is typically 0.004 below annular seating surface 36, with a 20° inclined surface 16 leading to groove bottom 20 which is planar and 0.0125" below annular locating surface providing a generally open path for coolant access.

An optional chip obstruction 50 at each corner promotes curling and chip breakage and protects adjacent inclined surface 16 by adding strain to the entering chip.

We claim:

1. A chip control insert comprising a polygon side cutting edge periphery, an inclined entry surface descending from said periphery to bottom surface, a planar annular seating surface projecting from said bottom surface above said periphery, polygon corner chip breaking means, said seating surface having a surrounding ramp wall, ascending from said bottom surface above said periphery, said annular seating surface having radius bulges intermediate each polygon side, a central through aperture, and a substantial area planar recess surrounding said aperture within said seating surface.

2. The chip control insert of claim 1 wherein said seating surface has outwardly extending pointed corner extremities.

3. The chip control insert of claim 2 including a chip obstruction at each of said outward extremities.

4. The chip control insert of claim 1 wherein said inclined entry surface descends at approximately 20° from the periphery of said insert.

5. The chip control insert of claim 1 wherein said ramp wall ascends at approximately 32° from said bottom surface.

6. The chip control insert of claim 4 wherein said ramp wall extends at approximately 32° from said bottom surface.

7. The chip control insert of claim 1 with ¼" side wall cutting edges approximately 0.004" lower than said seating surface.

8. The chip control insert of claim 4 wherein said bottom surface is approximately 0.0125" lower than said seating surface.

* * * * *